United States Patent
Lim

(10) Patent No.: US 12,268,135 B2
(45) Date of Patent: Apr. 8, 2025

(54) PLANT CULTIVATION DEVICE AND REFRIGERATOR

(71) Applicant: LG Electronics Inc., Seoul (KR)

(72) Inventor: Kiyoung Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 180 days.

(21) Appl. No.: 17/791,152

(22) PCT Filed: Dec. 17, 2020

(86) PCT No.: PCT/KR2020/018558
§ 371 (c)(1),
(2) Date: Jul. 6, 2022

(87) PCT Pub. No.: WO2021/141275
PCT Pub. Date: Jul. 15, 2021

(65) Prior Publication Data
US 2023/0029409 A1     Jan. 26, 2023

(30) Foreign Application Priority Data
Jan. 6, 2020 (KR) ........................ 10-2020-0001517

(51) Int. Cl.
*A01G 9/02* (2018.01)
*A01G 31/06* (2006.01)
*F25D 23/00* (2006.01)

(52) U.S. Cl.
CPC .............. *A01G 9/022* (2013.01); *A01G 31/06* (2013.01); *F25D 23/00* (2013.01); *F25D 23/003* (2013.01); *F25D 2323/0011* (2013.01); *F25D 2400/38* (2013.01)

(58) Field of Classification Search
CPC ...... F25D 23/00; F25D 23/003; F25D 23/006; F25D 2323/0011; F25D 2400/32; F25D 2400/38
See application file for complete search history.

(56) References Cited

U.S. PATENT DOCUMENTS

| | | | | |
|---|---|---|---|---|
| 2,660,505 A | * | 11/1953 | Eck ........................ | F25D 23/006 62/297 |
| 4,932,729 A | * | 6/1990 | Thompson .............. | E05D 7/081 312/405 |
| 2006/0168760 A1 | * | 8/2006 | Espindola ............. | F25D 23/028 16/374 |

FOREIGN PATENT DOCUMENTS

| | | | | | |
|---|---|---|---|---|---|
| CN | 204590892 U | * | 8/2015 | | |
| CN | 110375507 A | * | 10/2019 | .............. | F25D 11/02 |
| JP | H-01266482 A | * | 10/1989 | .............. | F25D 23/00 |
| JP | H-0926258 A | * | 1/1997 | .............. | F25D 23/06 |

(Continued)

*Primary Examiner* — Andrew Roersma
(74) *Attorney, Agent, or Firm* — Fish & Richardson P.C.

(57) ABSTRACT

An apparatus for cultivating plants and a refrigerator according to a embodiment of the present disclosure includes a cabinet including a cultivation chamber with an open front; a door configured to be rotatably coupled to the cabinet by hinges to open and close the cultivation chamber; a machine room provided under the cabinet; a pair of coupling frames configured to extend in a front and rear direction from both sides of the machine room; and a supporter configured to be mounted on the pair of coupling frames and to be supported on the ground, in which the front end of the coupling frame is positioned more forward than the front of the cabinet, and the supporter is positioned between the front end of the coupling frame and the front of the cabinet.

16 Claims, 6 Drawing Sheets

(56) References Cited

FOREIGN PATENT DOCUMENTS

| JP | 2003161572 A | * | 6/2003 | ............. F25D 23/00 |
|----|----|----|----|----|
| JP | 2010065935 A | * | 3/2010 | |
| KR | 920003198 Y1 | * | 5/1992 | ........... F25D 23/067 |
| KR | 980009122 U | * | 4/1998 | ........... F25D 23/006 |
| KR | 20120094184 | | 8/2012 | |
| KR | 20130088581 A | * | 8/2013 | ........... F25D 23/028 |
| KR | 101451343 | | 10/2014 | |
| KR | 200488545 | | 2/2019 | |
| KR | 101954251 | | 3/2019 | |
| KR | 101989037 | | 6/2019 | |
| KR | 20190088222 | | 7/2019 | |
| WO | WO-2016080086 A1 | * | 5/2016 | ............. F25D 23/00 |

* cited by examiner

PLANT CULTIVATION DEVICE AND REFRIGERATOR

CROSS-REFERENCE TO RELATED APPLICATIONS

This application is a National Stage application under 35 U.S.C. § 371 of International Application No. PCT/KR2020/018558, filed on Dec. 17, 2020, which claims the benefit of Korean Patent Application No. 10-2020-0001517, filed on Jan. 6, 2020. The disclosures of the prior applications are incorporated by reference in their entirety.

TECHNICAL FIELD

The present disclosure relates to an apparatus for cultivating plants and a refrigerator.

BACKGROUND ART

In general, an apparatus for cultivating plants includes a predetermined cultivation chamber having an environment appropriate to grow the plants, and stores plants in the predetermined cultivation chamber. The apparatus for cultivating plants has components to supply nutrients and light energy required for plant growth, and the plants are grown by the supplied nutrients and light energy.

Recently, a small apparatus for cultivating plants that can be placed on the interior like home appliances has been developed, and an apparatus for cultivating plants capable of cultivating plants by automatically adjusting water, nutrients, and light is being developed.

A plurality of beds for providing a cultivation chamber, which is a space in which plants are cultivated, are vertically disposed inside the cabinet of the apparatus for cultivating plants, and these beds are configured to be introduced or withdrawn in the front and rear directions by an introduction/withdrawal guide.

In addition, a door formed to open and close the cabinet is installed, and the door is rotatably coupled to the main body by hinged at one corner to the front of the main body.

Accordingly, when the user opens the door of the apparatus for cultivating plants or when a load is applied to the door or the bed in a state where the bed is withdrawn, the center of gravity of the apparatus for cultivating plants is moved to the front of the main body, and thus there is a risk that the apparatus for cultivating plants will be overturned forward.

In particular, in a case where the apparatus for cultivating plants is not a built-in manner supported by a separate fixing means, but a freestanding manner in which the device itself is installed in an independent form and can be moved and used as needed, the risk that the apparatus for cultivating plants is overturned forward becomes greater.

In Korea Patent Registration No. 10-1954251, a cultivation apparatus capable of cultivating plants is disclosed in which a tray is provided inside the case in which the cultivation space is formed, a pod containing seeds or seedlings is seated on the tray, adequate water and nutrients are supplied by recognizing the pod, and, light is irradiated by a light source module, but in the related art, the problem about a risk of overturning of such an apparatus for cultivating plants is not recognized.

DISCLOSURE

Technical Problem

An object of the present disclosure is to provide an apparatus for cultivating plants and a refrigerator capable of preventing the risk of the cabinet being overturned forward by the user's forward pulling force, in a case where the user rotates the door around the hinge member or moves a plurality of beds in front of the user.

In addition, an object of the present disclosure is to provide an apparatus for cultivating plants and a refrigerator capable of preventing the occurrence of a safety accident in which the bed does not sag downward and the bed is overturned forward the user even when the weight of the bed becomes heavy.

In addition, an object of the present disclosure is to provide an apparatus for cultivating plants and a refrigerator capable of preventing the door from sagging downward and thus preventing air in the cabinet interior space from leaking to the outside due to the sagging of the door.

In addition, an object of the present disclosure is to provide an apparatus for cultivating plants and a refrigerator capable of preventing the cabinet from being overturned forward the user in a case where an external load is applied while the user opens a door and takes out a bed or a water tank forward.

In addition, an object of the present disclosure is to provide an apparatus for cultivating plants and a refrigerator capable of greatly increasing structural stability against flow due to external force even when installed in a free-standing manner.

In addition, an object of the present disclosure is to provide an apparatus for cultivating plants and a refrigerator capable of preventing a cabinet from being overturned forward a user even when installed in a built-in manner.

In addition, an object of the present disclosure is to provide an apparatus for cultivating plants and a refrigerator that can be installed in a built-in manner or a free-standing manner by an operator by enabling a grill cover and a supporter to be detachably attached.

Technical Solution

An apparatus for cultivating plants according to an embodiment of the present disclosure may include a cabinet including a cultivation chamber with an open front; a door configured to be rotatably coupled to the cabinet by hinges to open and close the cultivation chamber; a machine room provided under the cabinet; a pair of coupling frames configured to extend in a front and rear direction from both sides of the machine room; and a supporter configured to be mounted on the pair of coupling frames and to be supported on the ground, in which the front end of the coupling frame may be positioned more forward than the front of the cabinet, and the supporter may be positioned between the front end of the coupling frame and the front of the cabinet.

The supporter may be positioned vertically below the door in a state where the door is closed.

The machine room may further include a machine room cover configured to shield the open front of the machine room, and the machine room cover may accommodate a portion of the coupling frame.

The front surface of the machine room cover may be positioned on the same extension line as the front surface of the door in a state where the door is closed.

The coupling frame may be formed of a metal material and extend along the side or lower surface of the machine room.

The coupling frame may include a first surface extending in the vertical direction; and a second surface bent in a direction intersecting with the first surface at the lower end of the first surface, in which the supporter may be mounted on the second surface.

The first surface may be in contact with a side surface of the machine room, and the second surface may be in contact with a lower surface of the machine room.

The first surface and the second surface may protrude more forward than the side surface and the lower surface of the machine room, and the supporter may be mounted more forward than the lower surface of the machine room.

The machine room cover may be coupled to the first surface.

The supporter may include a supporter in contact with the ground; and a rod portion configured to extend from the center of the support portion and having a thread formed on an outer circumferential surface to be coupled to the supporter, in which the distance between the supporter and the ground may be capable of being adjusted according to the rotation of the rod portion.

The supporter may pass through the lower surface of the machine room cover and is fastened to the coupling frame.

A cutout through which a portion of the supporter passes may be formed on a lower surface of the machine room cover.

The machine room cover may include a front surface; and a circumferential surface bent along the circumference of the front surface and configured to extend to the open front end of the machine room, and in which the circumferential surface may be coupled to the coupling frame.

A support bracket coupled to the coupling frame may be provided inside the machine room cover, and the supporter may be fastened through the support bracket.

The coupling frame may extend from the inside of the machine room.

A moving wheel may be mounted on the coupling frame, and the moving wheel may be positioned at a rear side of the supporter.

In another aspect, a refrigerator according to an embodiment of the present disclosure may include a cabinet including a storage space with an open front; a door configured to be rotatably coupled to the cabinet by hinges to open and close the storage space; a machine room provided under the cabinet; a pair of coupling frames configured to extend in a front and rear direction from both sides of the machine room; and a supporter configured to be mounted on the pair of coupling frames and to be supported on the ground, in which the front end of the coupling frame may be positioned more forward than the front of the cabinet, and the supporter may be positioned between the front end of the coupling frame and the front of the cabinet.

Advantageous Effect

The apparatus for cultivating plants and the refrigerator according to an embodiment of the present disclosure can expect the following effects.

According to an embodiment of the present disclosure, there is an effect that can prevent the risk of the apparatus for cultivating plants and the refrigerator from being overturned forward by the user's forward pulling force, in a case where the user rotates the door around the hinge member or moves the plurality of beds forward the user.

In addition, according to an embodiment of the present disclosure, there is an effect that even if the weight of the bed or shelf becomes heavy, the bed or shelf does not sag downward, thereby preventing the occurrence of a safety accident in which the bed or shelf is overturned forward the user.

In addition, according to the present disclosure, there is an effect that the doors of the apparatus for cultivating plants and the refrigerator do not sag downward, thereby preventing the air inside the cabinet from leaking to the outside due to the sagging of the door.

In addition, according to the present disclosure, there is an effect of preventing the apparatus for cultivating plants and the refrigerator from being overturned forward the user when an external load is applied while the user opens the door and the bed or water tank is withdrawn to the outside.

In addition, there is an effect that even if the apparatus for cultivating plants and refrigerator of the present disclosure are installed in a free-standing manner, structural stability against flow caused by an external force can be greatly improved.

In addition, even if the apparatus for cultivating plants and the refrigerator of the present disclosure are installed in a built-in manner, there is an effect of preventing the cabinet from being overturned forward the user.

In addition, the apparatus for cultivating plants and refrigerator of the present disclosure have the effect that the grill cover and the supporter can be detachably installed, so that the operator can properly install it in a built-in or free-standing manner.

BEST MODE

Hereinafter, specific embodiments of the present disclosure will be described in detail with drawings. However, the present disclosure cannot be said to be limited to the embodiments in which the spirit of the present disclosure is presented, and other disclosures that are degenerative by addition, change, deletion, or the like of other components or other embodiments included within the scope of the present disclosure are easily suggested.

Figure 1:
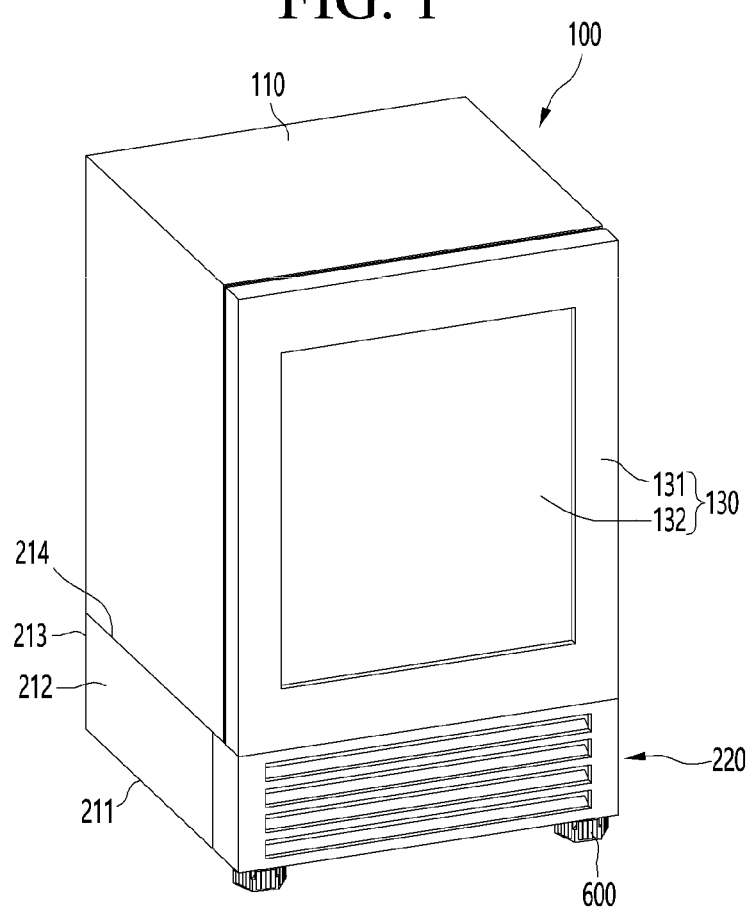
FIG. 1 is a perspective view of an apparatus for cultivating plants illustrating a state where a door is closed according to an embodiment of the present disclosure.
Figure 2:
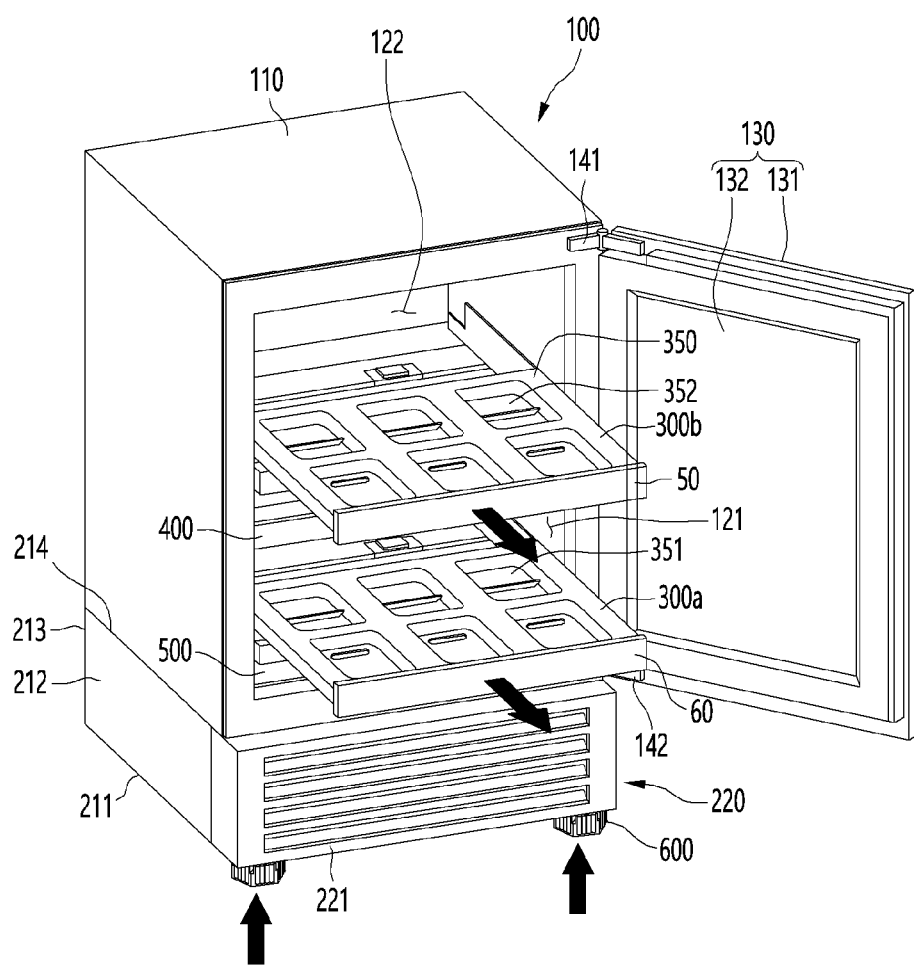
FIG. 2 is a perspective view illustrating a state where the tray is withdrawn while the door of the apparatus for cultivating plants is opened.

FIG. 1 is a perspective view illustrating an apparatus for cultivating plants 100 according to an embodiment of the present disclosure, and FIG. 2 is a perspective view illustrating a state where a door is opened for explaining an apparatus for cultivating plants 100 according to an embodiment of the present disclosure.

An apparatus for cultivating plants 100 according to an embodiment of the present disclosure may include: a cabinet 110 including cultivation chambers 121 and 122 having an open front; a door 130 that is rotatably mounted on the cabinet 110 and opens and closes the cultivation chambers 121 and 122; beds 300a and 300b which are provided to be introduced or withdrawn in the cultivation chamber, and on which a plurality of pods in which plants are cultivated by dividing the cultivation chambers 121 and 122 up and down are seated; a machine room 201 coupled to a lower surface of the cabinet 110 and provided with a compressor 202 and a condenser 203 constituting a refrigeration cycle for temperature adjustment of the cultivation chamber; a grill cover 220, also referred to as a machine room cover, that shields the open front of the machine room and has a passage through which air flows into and out of the machine room; and a pair of supporters 600 provided on the lower surface of the grill cover 220 and supported by the ground.

The apparatus for cultivating plants 100 will be described for each configuration.

The cabinet 110 is a portion that forms the outer appearance of the apparatus for cultivating plants.

Such a cabinet 110 is formed of a cylindrical body open to the front and includes an outer case 110 forming an outer wall surface and an inner case (not illustrated) forming an inner wall surface. Here, the outer case 110 may be formed of a cylindrical body with an upper surface closed, an open lower surface, and an open front surface.

In addition, the inner case is installed to be spaced apart from the outer case 110 while positioning in the outer case 110. In this case, a foam insulation material (not illustrated) may be filled in a space between the inner case and the outer case 110.

In addition, cultivation chambers 121 and 122, which are spaces in which plants are cultivated, are provided inside the inner case. The cultivation chamber is a single space and may be divided into upper and lower spaces by a bed provided in the cultivation chamber. In other words, the cultivation chambers 121 and 122 may include the first cultivation chamber 121 at the lower side and the second cultivation chamber 122 at the upper side.

The cabinet 110 may have a vertically elongated structure due to the characteristics of the disposition structure of the cultivation chambers 121 and 122 disposed vertically. In addition, the cabinet 110 may provide two or more spaces for the cultivation chambers 121 and 122 according to the number of the beds 300a and 300b disposed. In this case, the cabinet 110 can have a higher height.

Meanwhile, a door 130 may be provided on the front side of the cabinet 110.

The door 130 has a structure which is provided to open and close the cultivation chambers 121 and 122 of the cabinet 110, and the apparatus for cultivating plants 100 according to the embodiment of the present disclosure can be sealed by providing the door 130.

The door 130 may be configured to shield the front surface of the cabinet 110 with an opening/closing structure of any one of a rotary opening/closing structure or a sliding manner opening/closing structure, and in the embodiment of the present disclosure, the door 130 is made of a rotary opening/closing structure as an example.

In addition, the door 130 may include a door frame 131 having a rectangular frame structure with an open inside and a see-through window 132 for shielding the open inside of the door frame 131.

At this time, the see-through window 132 is preferably made of a material that can see through the inside, may be formed of, for example, glass, and in this case, a protective film for light blocking (partial blocking) that minimizes see-through generated by the penetration of the light in the cultivation chamber into the interior may be attached on the see-through window 132.

Of course, by forming the see-through window 132 itself to have a dark color instead of the protective film, the see-through window may be configured to minimize light penetration into the interior.

In addition, although not illustrated, the door 130 may be configured with only the see-through window 132 without the door frame 131 or may be configured with a structure in which the see-through window 132 does not exist.

In addition, an upper hinge 141 and a lower hinge 142 may be shaft-coupled to the upper end and lower end of one of both sides of the door 130 in the left and right direction. The door 20 may be rotatably coupled to the cabinet 110 by the upper hinge 141 and the lower hinge 142, and the cultivation space may be opened and closed by the rotation of the door 130.

Meanwhile, the apparatus for cultivating plants according to an embodiment of the present disclosure may include a machine room frame 200 provided to form a bottom portion.

The machine room frame 200 is installed below the outer case 110 and may include a bottom plate 211 forming a bottom surface, side plates 212 forming both side walls, and a back plate 213 forming a rear surface, and an upper surface plate 214 forming an upper surface.

In other words, the machine room frame 200 may be formed in a box-shaped structure with an open front, and a grill cover 220 may be provided on the open front of the machine room frame 200 that is forward the machine room 201.

In addition, the machine room 201 may include, for example, a refrigeration cycle including a compressor 202 and a condenser 203, and the internal temperature of the cultivation space may be adjusted through the refrigeration cycle. In addition, a fan guide 205 may be provided between the compressor 202 and the condenser 203, and a condenser fan 204 may be provided in the fan guide 205.

Meanwhile, the bed 300a, 300b is a portion provided to seat the pods containing the seeds and nutrients necessary for cultivation of plants, and the bed 300a, 300b is formed with a flat plate or tray 50, 60 structure having a circumferential wall so that the supply water can be stored on an upper surface thereof. The bed 300a, 300b may have a shelf-like structure on which pods can be seated, and thus the bed 300a, 300b may be referred to as a shelf.

In addition, the bed 300a, 300b is further provided with a bed cover 350. The bed cover 350 is a portion on which each pod is seated to be placed in a regular position, and a plurality of seating grooves 351 and 352 for seating each pod are formed on the upper surface.

In addition, a plurality of the beds 300a and 300b may be provided, and in this case, the beds 300a and 300b are installed to be vertically spaced apart from each other in the cultivation chambers 121 and 122.

The vertical separation distance between each of the beds 300a and 300b may be set differently according to the size of the cultivation chambers 121 and 122 or the type of plant to be cultivated.

Introduction/withdrawal guides may be provided on both sides of the cabinet 110, and both ends of the bed 300a, 300b may be supported in a state of being seated on the introduction/withdrawal guides, and the bed 300a, 300b may be introduced or withdrawn in the front and rear direction by the introduction/withdrawal guides. The bed 300a, 300b can be introduced or withdrawn from the inside of the cultivation space, and the pods can be easily seated and managed on the bed 300a, 300b in a state where the bed 300a, 300b are withdrawn.

In addition, the lighting module 400 is a portion that irradiates a light source to each pod placed on the beds 300a and 300b in the cultivation chambers 121 and 122, and by providing the lighting module 400, it is possible to continuously provide a light source to the plant despite being a closed-type cultivation device.

In addition, the apparatus for cultivating plants 100 of the present disclosure may include a water tank 500, a water supply module including a water pump and a water supply hose and may supply feed water to the beds 300a and 300b.

In this case, the water tank 500 may be positioned between the machine room 201 and the beds 300a and 300b and may be configured to be exposed to the interior by opening the door 130.

In detail, the water tank 500 may be configured to be exposed to the interior by opening the door 130. In other words, the door 130 is formed to block not only the cultivation chambers 121 and 122 but also the water tank 500 so that the water tank 500 is exposed when the door 130 is opened. In this case, the user can easily eject the water tank 500 to replenish the feed water.

The feed water in the water tank 500 may be pumped into the water supply hose by the pumping operation of the water pump positioned on the rear side of the water tank 500, and the pumped feed water may be delivered to the bed 300 by a water supply hose.

When the user withdraws the beds 300a and 300b or the water tank 500 in the state where the door is opened as illustrated in FIG. 2, due to the movement of the center of gravity, there is a risk that the apparatus for cultivating plants 100 will overturned forward the user. In the present disclosure, the front of the grill cover 220 is disposed on the same extension line of the door 130, and the supporter 600 is mounted on the grill cover 220 to prevent this risk of overturning.

Hereinafter, a freestanding manner of an apparatus for cultivating plants 100 in which the supporter 600 is mounted on the grill cover 220 according to an embodiment of the present disclosure will be described.

Figure 3:
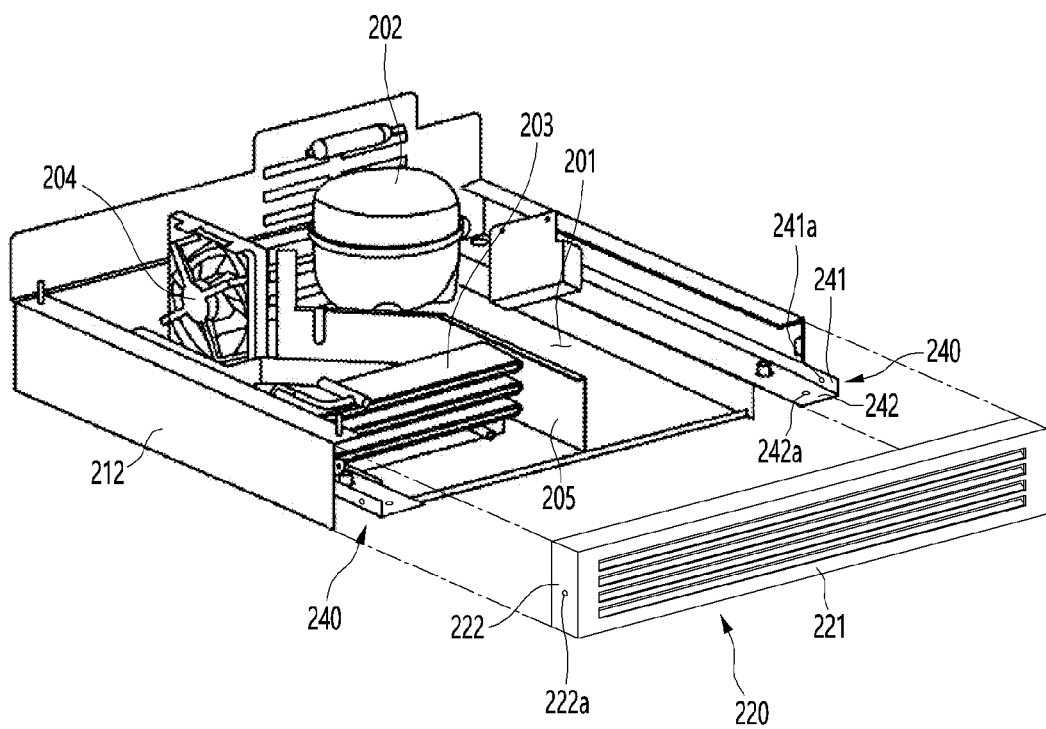
FIG. 3 is a perspective view illustrating a machine room in an open state of the grill cover of the apparatus for cultivating plants.
Figure 4:
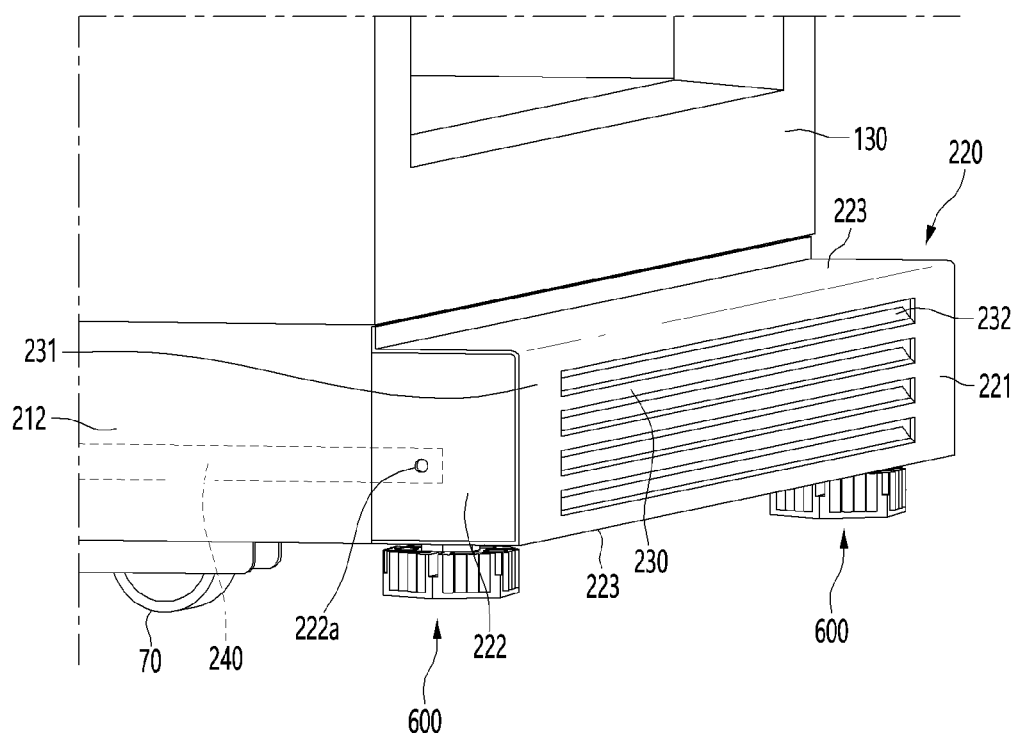
FIG. 4 is a perspective view illustrating the lower front of the apparatus for cultivating plants.
Figure 5:
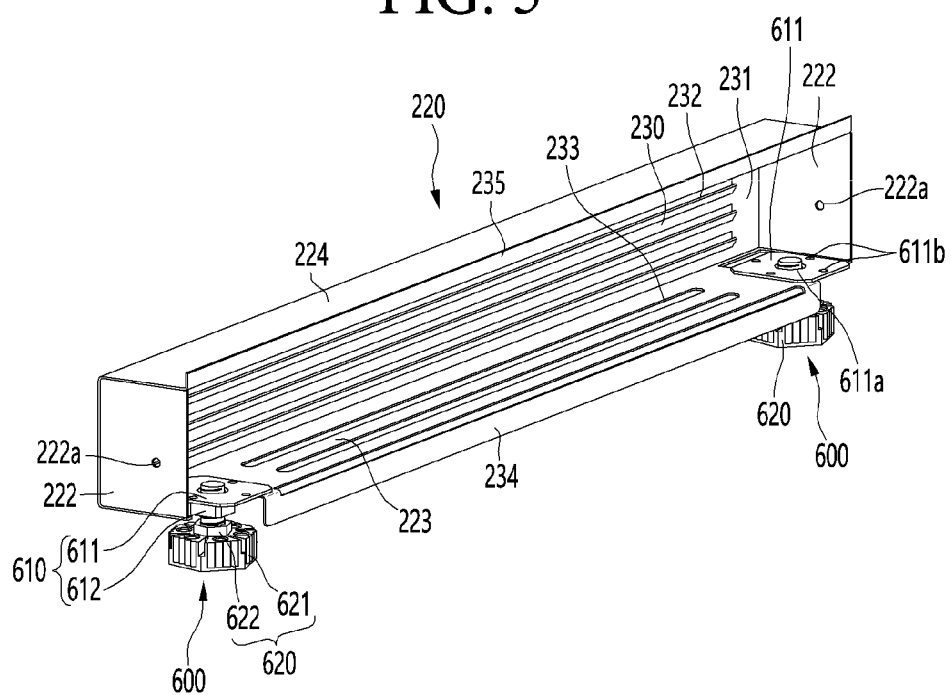
FIG. 5 is a perspective view illustrating a structure in which a supporter is mounted on the grill cover.
Figure 6:
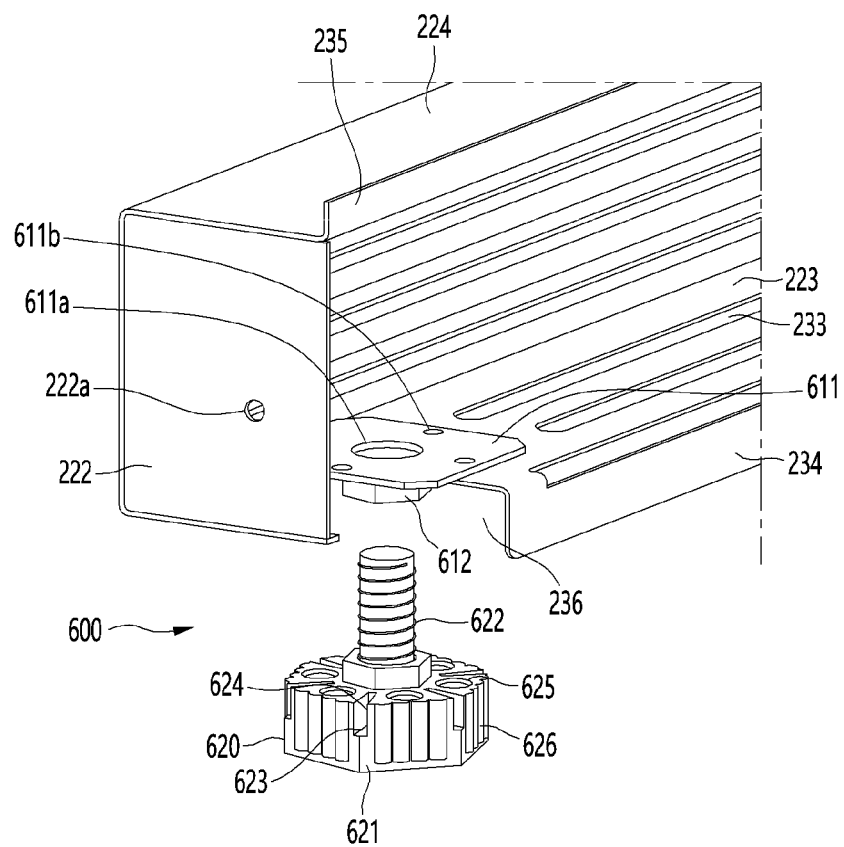
FIG. 6 is an exploded perspective view illustrating a structure in which a supporter is mounted on the grill cover.
Figure 7:
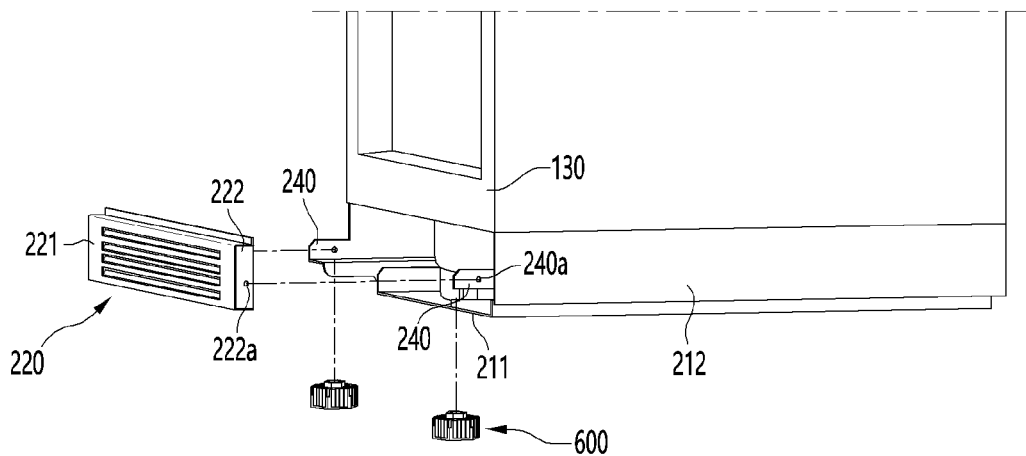
FIG. 7 is an exploded perspective view illustrating a structure in which a supporter is mounted on a grill cover of the apparatus for cultivating plants.

FIG. 3 is a view illustrating the inside of the machine room 201 in a state where the grill cover 220 is opened, FIG. 4 is a view illustrating the lower portion of a freestanding manner of an apparatus for cultivating plants 100 provided with a supporter 600 on the grill cover 220, FIG. 5 illustrates a state where the supporter 600 is mounted on the grill cover 220, and FIG. 6 is an exploded perspective view illustrating the grill cover 220 and the supporter 600.

The machine room frame 200 according to an embodiment of the present disclosure extends in the front and rear directions along the side plate 212, and a pair of coupling frames 240 protruding more forward than the opened front surface of the machine room can be provided.

In addition, the moving wheel 70 is mounted on the coupling frame 240, and the moving wheel 70 may be positioned at the rear of the supporter 600.

A plurality of the moving wheels 70 are mounted along the bottom surface of the coupling frame 240 to support the apparatus for cultivating plants when the apparatus for cultivating plants is moved, and it is possible to more conveniently move the position thereof.

In addition, the coupling frame 240 may include a vertical surface 241 extending parallel to the side plate 212, and a horizontal face 242 bent in a direction intersecting the vertical surface 241 along the vertical surface 241.

Accordingly, the coupling frame 240 may be formed of a metal material, and may have a structure in which strength is reinforced by being configured to have a structure bent by the vertical surface 241 and the horizontal surface 242. Accordingly, the shape of the machine room 201 can be maintained by the coupling frame 240 extending along both sides of the machine room 201. In addition, it may be formed so as not to be deformed even by a load applied due to the mounting of the moving wheel 70 and the mounting of the supporter 600.

A vertical hole 241a through which a screw passing through the grill cover 220 is fastened may be formed in the vertical surface 241 to fix the grill cover 220. In addition, a horizontal hole 242a to which a screw for fixing the supporter 600 is fastened may be formed in the horizontal surface 242.

In the present disclosure, the side grill 222 of the grill cover 220 is extended forward so that the grill cover 220 can be positioned on the same extension line as the front of the door 130, so that the supporter 600 can be positioned as far forward as possible.

Therefore, even if the door 130 is opened, the bed 300a, 300b, or the water tank 500 is withdrawn and the center of gravity is slightly moved forward, the apparatus for cultivating plants 100 can be prevented from being overturned. In particular, in a state where the door is opened and the beds 300a and 300b and the water tank 500 are withdrawn by making the position of the supporter 600 substantially more forward than the front of the cabinet 110 and even if a load is applied to the door 130, the beds 300a, 300b, or the water tank 500 in a state where the beds 300a and 300b and the water tank 500 are withdrawn, it is possible to prevent the apparatus for cultivating plants from being overturned.

The grill cover 220 according to an embodiment of the present disclosure may include a front surface 221 on which a grill through which air flows in and out is formed, circumferential surfaces 222, 223, 224 extending rearward along the circumference of the front surface, and a lower shielding surface 234 that is bent downward along the lower end of the circumferential surface to shield the area below the machine room 201.

The grill cover 220 may be formed of a metal material and may be formed by bending both sides and upper and lower surfaces based on the front surface.

In detail, the front surface 221 of the grill cover may include a grill body 230 having an opening, and a plurality of horizontal ribs 232 may be provided in the opening of the grill body 230 at set intervals.

Specifically, the front surface 221 of the grill cover may include a grill body 230 and a grill edge 231. The grill body 230 forms an opening through which air flows.

A plurality of horizontal ribs 232 are formed in the opening formed in the grill body 230 at set intervals, and air may be suctioned in or discharged from through an air flow passage formed through the horizontal ribs 232. The horizontal ribs 232 may have an inclination, and the air discharged from the machine room 201 may have a directionality.

In addition, a cover hole 222a through which a screw fastened to the coupling frame 240 is penetrated is formed on both side surfaces 222 of the circumferential surface in the left and right direction. In other words, the screw penetrates through the cover hole 222a and is fastened to the coupling frame 240 so that the grill cover 220 can be maintained in a fixed state at a set position.

The circumferential surfaces 222, 223, and 224 may extend to have a predetermined width, and in a state where the grill cover 220 is mounted on the coupling frame 240, the front surface 221 may be positioned at a position corresponding to the front surface of the door 130.

In addition, the lower surface 223 of the circumferential surface may include a plurality of lower surface openings 233 at set intervals to further provide a passage through which air is suctioned or discharged from the machine room 201 on the lower surface of the grill cover 220.

In addition, on both sides of the lower surface 223 of the circumferential surface, a cutout 236 through which a portion of the supporter 600 passes may be formed. Specifically, both sides of the lower surface 223 of the circumferential surface may be cut to be formed shorter than the width of the upper grill 224 and may be seated through the supporter 600.

The lower shielding surface 234 may shield the space between the apparatus for cultivating plants 100 and the ground so as not to be exposed to the outside. In other words, it is possible to prevent excessive exposure of the space under the apparatus for cultivating plants spaced apart by the moving wheel 70 and the supporter 600.

In addition, an upper shielding surface 235 may be further formed at the rear end of the upper surface 224 of the grill cover. The upper shielding surface 235 may shield the upper end of the machine room. In other words, since the upper shielding surface 235 extends upward from the rear end of the upper surface of the grill cover 200, it is possible to shield the upper end of the machine room without interfering with the door 130. Accordingly, the upper surface 224 of the grill cover may be positioned at a lower position than the upper end of the machine room 201 and may be spaced apart from the lower end of the door 130 so as not to interfere with opening and closing of the door 130.

In addition, an embodiment of the present disclosure is provided on the lower surface of the grill cover 220 and includes a pair of supporters 600 supported by the ground.

The supporter 600 may be positioned forward the cabinet 100 of the apparatus for cultivating plants 100. This is to prevent the center of gravity from moving forward as much as possible even if the center of gravity is moved by the user's withdrawal of the beds 300a and 300b and the water tank 500, opening of the door 130, or an external force.

The supporter 600 extends downward from the grill cover 220 and may include a supporting member 620 in contact with the ground and a support bracket 610 connecting the supporting member 620 and the grill cover 220.

The support bracket 610 may be made of a metal material. In addition, the support bracket 610 may be provided inside the grill cover 220 to be coupled to the grill cover 220 or the coupling frame 240.

A bracket hole 611b through which a screw for fixing the grill cover 220 is fastened through the grill cover 220 may be formed in the support bracket 610.

Specifically, the support bracket 610 may include a connection portion 611 seated on the bottom surface 223 of the grill cover and a fixing portion 612 which protrudes downward from the connection portion 611, and in which a through hole 611a on which the supporting member 620 is coupled is formed.

The connection portion 611 is seated on the bottom grill 223 and may be formed to be in contact with the lower end of the side grill 222.

In addition, in the connection portion 611, a hole 611a may be formed in the center of the connection portion 611 so that the supporting member 620 can be coupled, and the central hole 611a is connected to the fixing portion 612 protruding downward of the connection portion 611.

The fixing portion 612 may be screw-coupled to the supporting member 620 to connect the supporting member 620 to the support bracket 610.

In addition, the connection portion 611 may further include a bracket hole 611b to be connected to the grill cover 220.

A plurality of the bracket holes 611b are formed in the upper, lower, left, and right of the connection portion 611, so that when an operator couples the supporter 600 to the grill cover 220, the operation can be facilitated.

In an embodiment of the present disclosure, the bracket hole 611b may be disposed at a position corresponding to the horizontal hole 242a, and fixing means such as a screw penetrates through the horizontal hole 242a and the bracket hole 611b and thus the fixing state of the grill cover 220 and the support bracket 610 at a set position can be maintained.

In another embodiment of the present disclosure, the bracket hole 611b may be disposed at a position corresponding to the bottom hole (not illustrated) formed on both sides of the bottom surface of the grill cover 220, and fixing means such as a screw penetrates through the lower surface hole and the bracket hole 611b, and thus the fixed state of the grill cover 220 and the support bracket 610 at a set position can be maintained.

In addition, the supporting member 620 may include a support portion 621 having a columnar shape having a regular polygonal cross section such as a regular hexagon, a regular octagon, and a regular decagon or a rod shape having circular cross-section; and a rod portion 622 coupled to the fixed portion.

In addition, the support portion 621 may be formed with a plurality of accommodation grooves 623 recessed from the circumferential surface toward the axial center. In addition, a plurality of the accommodation grooves 623 may be disposed at set intervals along the circumferential surface of the support portion 621.

In addition, a slot 624 cut out from the upper end portion of the supporting member 620 to the accommodation groove 623 may be formed in each accommodation groove 623.

In addition, the support portion 621 may further include a plurality of circular grooves 625 recessed downwardly between the respective slots 624.

With this configuration, the end portion of a tool such as a driver may be inserted into the accommodation groove 623 or slot 624 formed in the support portion 621 of the supporting member 620 to rotate the support portion 621.

In addition, a plurality of ribs 626 may be formed to protrude along the axial direction on the circumferential surface of the support portion 621.

Meanwhile, in the rod portion 622, corresponding threads are formed on the inner circumferential surface of the fixing portion 621 and the outer circumferential surface of the rod portion 622, so that the rod portion 622 is screwed to the fixing portion 621 and may be composed of bolts having a generally set pitch.

Also, the supporter 600 may be formed by so-called insert molding.

In the apparatus for cultivating plants 100 according to an embodiment of the present disclosure, the supporter 600 is mounted on both sides of the bottom surface 223 of the grill cover 220, and the grill cover 220 on which the supporter 600 is mounted may be configured to be connected to the coupling frame 200.

In another embodiment of the present disclosure, the supporter 600 extends downward from the grill cover 220 and may include a supporting member 620 in contact with the ground, and a support bracket 610 for connecting the supporting member 620 and the coupling frame 240.

In detail, on the horizontal surface 242 of the coupling frame 240, a horizontal hole 242a to which a screw for fixing the supporter 600 is fastened is formed, and the horizontal hole 242a may be fastened and fixed by a bracket hole 611b and a screw provided in the support bracket 610.

In addition, cut-outs 236 through which a part of the supporter 600 passes may be formed on both sides of the lower surface of the grill cover 220 corresponding to the supporter 600, and the support bracket 610 may be connected to and fixed to the coupling frame 240 from the upper side of the cut-out 236.

In addition, in another embodiment of the present disclosure, the support bracket 610 is to be fastened and fixed together with the horizontal surface 242 of the coupling frame by a bracket hole 611b provided on the lower surface of the grill cover and a screw.

Meanwhile, in a case where the apparatus for cultivating plants 100 according to another embodiment of the present disclosure is installed in a built-in manner, a structure is provided in which the front of the machine room is structurally disposed more rearward than the door 130 due to the installation of a washboard.

The length of the side surface of the grill cover applied to the built-in manner of the apparatus for cultivating plants may be shorter than the length of the side of the grill cover applied to the freestanding manner.

Meanwhile, the apparatus for cultivating plants 1 according to an embodiment of the present disclosure forms a space in which the cabinet 100 is insulated, a door 130 for opening and closing the inner space is provided, and since the components of the refrigeration cycle for temperature adjustment of the inner space are provided, the apparatus for cultivating plants may be viewed as a kind of refrigerator. In other words, the main components of the apparatus for cultivating plants may be substantially the same as that of the refrigerator.

Accordingly, another embodiment of the present disclosure may be applied to a refrigerator including the cabinet 100, the door 130, the components constituting the refrigeration cycle, and related components such as the machine room 201 and the supporter 600.

For example, the refrigerator 1 according to another embodiment of the present disclosure includes: a cabinet 100 including a storage space having an open front; a door 130 that is rotatably coupled to the cabinet 100 by a hinge to open and close the storage space and has a see-through window 132 through which the interior of the storage space can see through; shelves 300a, 300b provided so as to be able to be introduced or withdrawal in the storage space; a pair of side plates 212 for accommodating the compressor 202 and the condenser 203 constituting the refrigeration cycle, and forming both sides of the machine room 201 whose front is opened from the lower part of the cabinet 100; a pair of coupling frames 240 extending in the front and rear direction along the side plate 212 in the inside of the machine room 201 and protruding more forward than the opened front surface of the machine room 201; and a supporter 600 coupled to the forward protruding portion of the pair of coupling frames 240 and supported on the ground, and the supporter 600 is positioned below the door 130 to prevent the cabinet 100 from being overturned, in a state where the door 130 closes the storage space.

The refrigeration cycle may include an evaporator, and the evaporator may be disposed inside the storage space.

The supporter 600 may be positioned more forward than the front of the cabinet 100.

The see-through window 132 may be formed of a glass material.

At both sides of the cabinet 100, introduction/withdrawal guides for supporting both ends of the shelves 300a and 300b to be introduced or withdrawn may be provided.

The refrigerator may further include a water tank 500 disposed to be capable of being introduced or withdrawn inside of the storage space; and a water supply module for supplying water from the water tank 500 to the shelves 300a and 300b.

The water tank 500 is disposed between the machine room 201 and the shelves 300a and 300b and may be exposed when the door 130 is opened.

Inside the machine room 201, a compressor 202 and a condenser 203 are provided and the open front of the machine room 201 is shielded, and a grill cover 220 in which an opening through which air flows in and out of the machine room 201 is formed may be provided.

The front surface of the grill cover 220 may be positioned on the same extension line as the front surface of the door 130 in a state where the door 130 is closed.

The coupling frame 240 is formed of a metal material, and includes a vertical surface 241 extending parallel to the side plate 212 and a horizontal surface 242 bent in a direction intersecting the vertical surface at the lower end of the vertical surface 241, the supporter 600 may be fixed to the horizontal surface 242.

The grill cover 220 may be fixed to the vertical surface 241.

The supporter 600 may include a support portion 621 in contact with the ground, and a rod portion 622 extending from the center of the support portion 621 and having a thread formed on the outer circumferential surface so that the supporter 600 is fixedly mounted.

A cutout 236 through which a portion of the supporter 600 passes may be formed on a lower surface of the grill cover 220.

The grill cover 220 includes a front surface 221 on which a grill through which air flows in and out is formed; circumferential surfaces 222, 223, 224 extending rearward along the circumference of the front surface 221, and both side surfaces of the circumferential surfaces 222, 223, 224 in the left and right direction may be coupled to the coupling frame 240.

The grill cover 220 may further include a shielding surface 235 bent downward along the lower ends of the circumferential surfaces 222, 223, and 224 to shield the lower area of the machine room 201.

A moving wheel 70 is mounted on the coupling frame 240, and the moving wheel 70 may be positioned at a rear side of the supporter 600.

INDUSTRIAL APPLICABILITY

The apparatus for cultivating plants and the refrigerator according to an embodiment of the present disclosure have high industrial applicability because safety is secured through the overturning prevention structure.

The invention claimed is:
1. An apparatus for cultivating plants comprising:
 a cabinet defining a cultivation chamber with an open front;
 a door rotatably coupled to the cabinet and configured to open and close the cultivation chamber;
 a machine room disposed under the cabinet;

a machine room cover configured to cover an open front of the machine room;

a pair of coupling frames configured to extend in a front and rear direction from both sides of the machine room; and a supporter mounted on the pair of coupling frames and configured to be supported on a ground surface, wherein a front end of a coupling frame of the pair of coupling frames is disposed more forward than a front of the cabinet, wherein the supporter is disposed between the front end of the coupling frame and the front of the cabinet, and wherein the supporter is mounted on the machine room cover, and the machine room cover is detachably coupled to the pair of coupling frames.

2. The apparatus for cultivating plants of claim 1,
wherein the supporter is configured to be disposed vertically below the door, based on the door being closed.

3. The apparatus for cultivating plants of claim 1,
wherein the machine room cover accommodates a portion of the coupling frame.

4. The apparatus for cultivating plants of claim 3,
wherein a front surface of the machine room cover is configured to be disposed on the same extension line as a front surface of the door, based on the door being closed.

5. The apparatus for cultivating plants of claim 3,
wherein the coupling frame is made of a metal material and configured to extend along a side or a lower surface of the machine room.

6. The apparatus for cultivating plants of claim 3,
wherein the coupling frame includes
a first surface extending in a vertical direction; and
a second surface bent in a horizontal direction intersecting with the first surface at a lower end of the first surface,
wherein the supporter is mounted on the second surface.

7. The apparatus for cultivating plants of claim 6,
wherein the first surface is in contact with a side surface of the machine room, and
wherein the second surface is in contact with a lower surface of the machine room.

8. The apparatus for cultivating plants of claim 6,
wherein a portion of the first surface and the second surface protrude more forward than a side surface and a lower surface of the machine room, and wherein the supporter is mounted on the portion of the first surface that protrudes more forward than the lower surface of the machine room.

9. The apparatus for cultivating plants of claim 8,
wherein the machine room cover is coupled to the first surface.

10. The apparatus for cultivating plants of claim 3,
wherein the supporter includes
a support portion configured to be in contact with the ground surface; and
a rod portion extending from a center of the support portion and having a thread formed on an outer circumferential surface of the rod portion, and
wherein the supporter is configured to, based on a rotation of the rod portion, adjust a distance between the machine room and the ground surface.

11. The apparatus for cultivating plants of claim 3,
wherein the supporter passes through a lower surface of the machine room cover and is fastened to the coupling frame.

12. The apparatus for cultivating plants of claim 11,
wherein a cutout is defined on a lower surface of the machine room cover through which a portion of the supporter passes.

13. The apparatus for cultivating plants of claim 3,
wherein the machine room cover includes
a front surface; and
a circumferential surface bent along a circumference of the front surface and extending to the open front of the machine room, and
wherein the circumferential surface is coupled to the coupling frame.

14. The apparatus for cultivating plants of claim 3,
wherein a support bracket coupled to the coupling frame is disposed inside the machine room cover, and
wherein the supporter is fastened to the coupling frame through the support bracket.

15. The apparatus for cultivating plants of claim 1,
wherein the coupling frame extends from the inside of the machine room.

16. The apparatus for cultivating plants of claim 15,
wherein a moving wheel is mounted on the coupling frame, and
wherein the moving wheel is disposed at a position rear of the supporter.

* * * * *